US008775311B2

(12) United States Patent
Davis et al.

(10) Patent No.: US 8,775,311 B2
(45) Date of Patent: Jul. 8, 2014

(54) SYSTEMS AND METHODS FOR PRE-AUTHORIZED MONEY TRANSFER TRANSACTIONS

(75) Inventors: Matthew Davis, Dallas, TX (US); Kunle Olamuyiwa, Agege (NG); Sabrina Chan, Happy Valley (CN); Tara Bertram, Maple Grove, MN (US)

(73) Assignee: Moneygram International, Inc., Minneapolis, MN (US)

( * ) Notice: Subject to any disclaimer, the term of this patent is extended or adjusted under 35 U.S.C. 154(b) by 0 days.

(21) Appl. No.: 13/228,276

(22) Filed: Sep. 8, 2011

(65) Prior Publication Data
US 2013/0066778 A1 Mar. 14, 2013

(51) Int. Cl.
*G06Q 40/00* (2012.01)
*G06Q 20/40* (2012.01)
*G06Q 40/02* (2012.01)
*G06Q 20/04* (2012.01)

(52) U.S. Cl.
CPC .............. *G06Q 20/40* (2013.01); *G06Q 40/02* (2013.01); *G06Q 40/00* (2013.01); *G06Q 20/04* (2013.01)
USPC .......................................................... 705/44

(58) Field of Classification Search
CPC ....... G06Q 40/00; G06Q 40/02; G06Q 20/04; G06Q 20/042
USPC .......................................................... 705/44
See application file for complete search history.

(56) References Cited

U.S. PATENT DOCUMENTS

2012/0030100 A1* 2/2012 Bulawa et al. .................. 705/40

* cited by examiner

*Primary Examiner* — Sarah Monfeldt
*Assistant Examiner* — Clifford Madamba
(74) *Attorney, Agent, or Firm* — Fulbright & Jaworski LLP; Nathan Rees

(57) ABSTRACT

Methods and systems which allow one or more money transfer transactions to be implemented in a manner which provides additional certainty to a receiving party are provided. In one embodiment, a money transfer service authorizes a sender to transfer up to a certain amount of money. With this authorization, a money transfer transaction regiment is established, while the money transfer service maintains an accounting of the balance to insure that the balance remains below the pre-determined authorized amount. In another embodiment, a money transfer services utilizes reliability criteria to authorize a sender to transfer money with the money and service charge being collected after the transfer is completed.

10 Claims, 3 Drawing Sheets

SYSTEMS AND METHODS FOR PRE-AUTHORIZED MONEY TRANSFER TRANSACTIONS

TECHNICAL FIELD

The present application relates to money transfer transactions, and more specifically to systems and methods for facilitating pre-authorized money transfer transactions.

BACKGROUND

Generally speaking, money transfers are real-time transactions in that a transaction begins when a sender initiates the transaction at the time the money is to be sent to a receiving party. For example, a money transfer may be utilized in an emergency setting such as when a receiving party has an immediate need for funds. In such a transaction, a sender initiates a money transfer transaction and provides the funds to a money transfer agent. The agent may then provide a transaction code or some other form of transaction identifier to the sender. The sender will then provide the transaction code or identifier to the receiver. With this code the receiver may enter an agent location and complete the transaction and receive the transferred funds.

Some real-time money transfer transactions occur on a more regular basis. For example, some money transfer customers have family or other dependent parties who have come to rely on regular money transfers to meet their respective needs. Such money transfers may occur proximate to the time that the sender receives a paycheck, thereby providing a steady stream of financial assistance to the receiving party. In many instances these transactions are sent from a family member who may be thought of as a breadwinner for other family members in a foreign country. These family members are often highly dependent on receipt of these regular money transfer transactions. Further, there are several villages, cities, and even countries in the world wherein regular money sent from breadwinner relatives accounts for a meaningful part of their gross domestic product. For example, retailers in a community where its citizens are dependent on foreign financial inflow may be required to purchase goods in reliance on, and corresponding to the timing of, these regular money transfer transactions. As such, there is a potentially drastic impact on relatives receiving such funds and their corresponding community during instances when these regular transfers either cease or become uncertain.

BRIEF SUMMARY

The present application provides for methods and systems which allow one or more money transfer transactions to be implemented in a manner which provides additional certainty to a receiving party. According to one embodiment, a money transfer service authorizes a sender to transfer up to a certain amount of money. With this authorization, a money transfer transaction regiment is established, while the money transfer service maintains an accounting of the balance to insure that the balance remains below the pre-determined authorized amount.

In another embodiment, a money transfer service may pre-authorize a sender to send an amount of money, up to a pre-authorized amount, to a receiver at a specified time. In this embodiment, the pre-authorization of the sender is based on certain reliability criteria such that the money transferred and service charge may be collected after the money transfer is completed. In more detailed embodiments the specified time may be set in accordance with a periodic recurring money transfer schema, while in yet another embodiment the specified time may be specified by the receiving party.

Another embodiment of the invention includes a system designed to collect information about a sender and utilize reliability information to determine a balance of money available to the sender by the money transfer service to be transferred to one or more receivers in one or more transactions. This embodiment also includes a decision engine which utilizes information regarding previous money transfer transactions and payment history for the sender in order to make a determination as to whether subsequent transfer transactions will be authorized.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
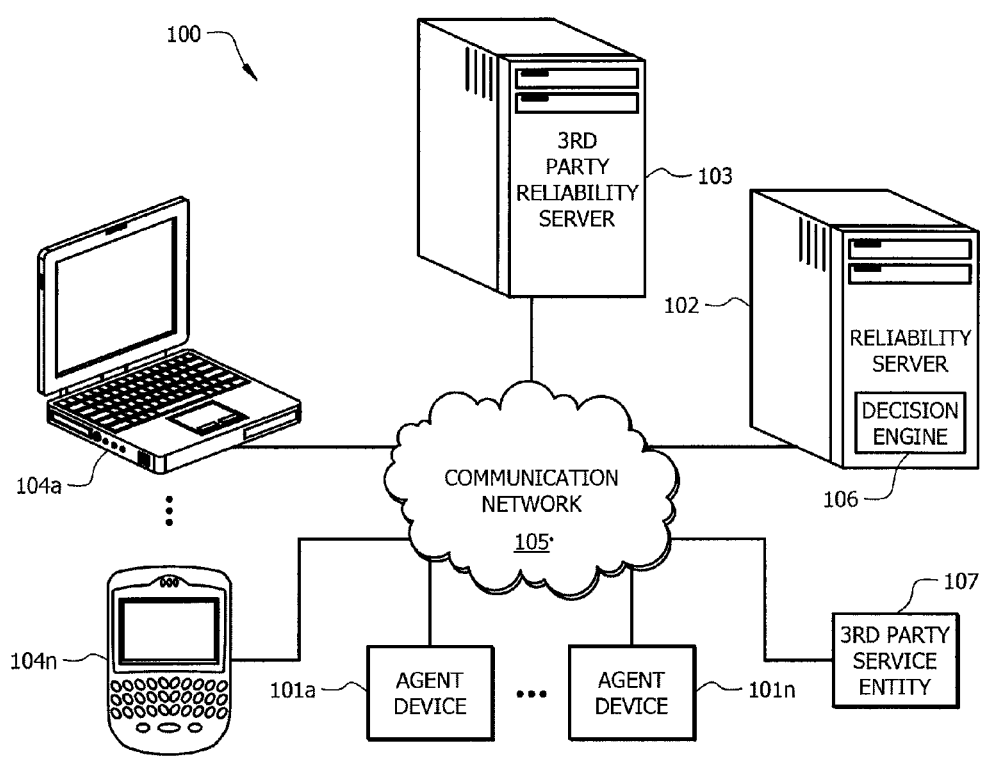
FIG. 1 illustrates a system for facilitating one or more money transfer transactions in accordance with an embodiment of the present application.

FIG. 1 illustrates a system 100 for facilitating one or more money transfer transactions in accordance with an embodiment of the present application. System 100 includes agent devices 101*a*-101*n*, transaction reliability information database 102, third party transaction reliability information database 103, and user devices 104*a*-104-*n*, each in communication with others over communication network 105.

Communications between devices in system 100 may be facilitated in whole, or in part, by communication network 105. Communication network 105 may comprise the Internet, WiFi, mobile communications networks such as GSM, CDMA, 3G/4G, WiMax, LTE, and the like. Further, communications network 105 may comprise a combination of network types working collectively.

Agent devices 101a-101n may correspond to computer systems within a money transfer agent location. Agent devices 101a-101n could include special purpose computers programmed to implement steps described herein, or could be conventional processing devices configured to run software which facilitates the described money transfer transactions. For example, such devices may be computer systems which are accessible by an agent at an agent location, may be automated machines such as an Automated Teller Machine (ATM), and the like. Agent devices 101a-101n may be located throughout the world and one or more devices may be utilized within a single money transfer transaction. Agent devices 101a-101n are configured to send and receive information over communication network 105. In some embodiments, agent devices 101a-101n may also have a direct connection with transaction reliability information database 102. Agent devices 101a-101n may be configured to transmit transaction information between respective devices of system 100.

Transaction reliability information database 102 may be implemented as a computing device, as a network of computing devices, or in any manner that facilitates one or more of the storage, compilation and communication of reliability information within system 100. In some embodiments, transaction reliability information database 102 may be distributed among agent locations within agent devices 101a-101n. Transaction reliability information database 102 is configured to compile, store and provide transaction reliability information regarding a sending party in a money transfer transaction. Transaction reliability information may include information regarding the type of transfer being made, the previous transfer history of the sender, credit ratings, financial accounts or any other information pertinent to the reliability of the sending party. Transaction reliability information may be compiled using data received from agent devices regarding the user, the user's transaction history, etc.

It is noted that when taking into account the type of transfer being made, some embodiments may also utilize information regarding the intended recipient of transferred funds. For example, in a breadwinner-style money transfer transaction it is notable in that the receiving party may be comprised of family members of the sender. This information would be indicative of the transaction and sender being more reliable party as the sending party would likely be less prone to fail to provide payment for such a transaction. As such, information regarding the transfer being made may include situational information surrounding the transaction.

Transaction reliability information database 102 may also include a transaction reliability decision engine 106. Transaction decision engine 106 may utilize information compiled by database 102 in order to make a determination as to whether a sender may be extended the courtesy of implementing a money transfer transaction prior to providing payment to a money transfer agent. Further, transaction decision engine may pre-authorized a maximum amount of money in which a sending party may send prior to providing such payment. Transaction decision engine 106 may also maintain an accounting of transactions sent by a sending party in order to determine whether payment has been made for previous transactions, whether the sender is approaching or exceeding their pre-authorized maximum amount, and the like. As with transaction reliability information database 102, transaction decision engine 106 may also be part of a distributed network. Additionally, in some embodiments, transaction decision engine 106 may be implemented in whole or in part within agent devices 101a-101n.

Transaction reliability information may be further compiled utilizing one or more services corresponding to third party transaction reliability database 103. Third party transaction reliability database 103 may correspond to services which report on the validity of a banking account of the sending party and credit-worthiness of an individual, such as TeleCheck. Further, third party transaction reliability database 103 may correspond to credit reporting services such as Equifax, Experian, Transunion, and the like. Information from third party databases may be sent to transaction reliability information database 102, or directly to one or more agent devices 101a-101n to assist in facilitating reliability determinations.

In some embodiments, decision engine 106 may utilize a scoring system to generate a reliability score. In some embodiments, such a reliability score may exclusively take into account information known to the money transfer agent. Additionally, in some embodiments a generated reliability score may also take into account third party reliability information. Moreover, while some third party reliability information may be taken into account, some embodiments may authorize transactions without the use of information from standard credit reporting agencies.

In another embodiment, transaction reliability information database 102 and decision engine 106 may be utilized to create a scoring system which may be utilized by outside third party service entities 107 for other types of transactions. For example, utility companies, mobile phone providers, payday lending services, and the like may utilize this scoring system which takes into account information regarding the sender and transaction types in order to authorize their respective transactions.

User devices 104a-104n may be any type of device which would facilitate the exchange of information within system 100. For example, client devices may include computer systems, tablet devices, mobile telephones, and the like. Different embodiments may utilize different aspects of the types of client devices. For example, mobile telephones and tablet devices may have the ability to connect with various communications networks and may have different application execution capabilities. User devices 104a-104n may be utilized before, during and after a money transfer transaction in any manner to facilitate convenient and secure transactions.

For example, a user device 104 may be utilized to initiate a transaction and to begin the process of compiling reliability information corresponding to a sender. The initial information may be sent to an agent location to facilitate an expedient transaction. Further, in some embodiments, applications executed on user devices 104a-104n may initiate the described money transactions and send the funds with the assistance of one or more of transaction reliability information database 102 or an agent device 101.

Further, a user device 104 may be utilized to provide transaction information to a sender or receiver. For example, once a money transfer transaction is initiated, a transaction code may be sent to the sender or receiving party. In the event that the transaction code is sent to the sender, the sender may convey that code to the receiver. Such a transaction code may be utilized by the receiving party to initiate the receipt of the money transfer transaction in order to complete the transaction.

Figure 2:
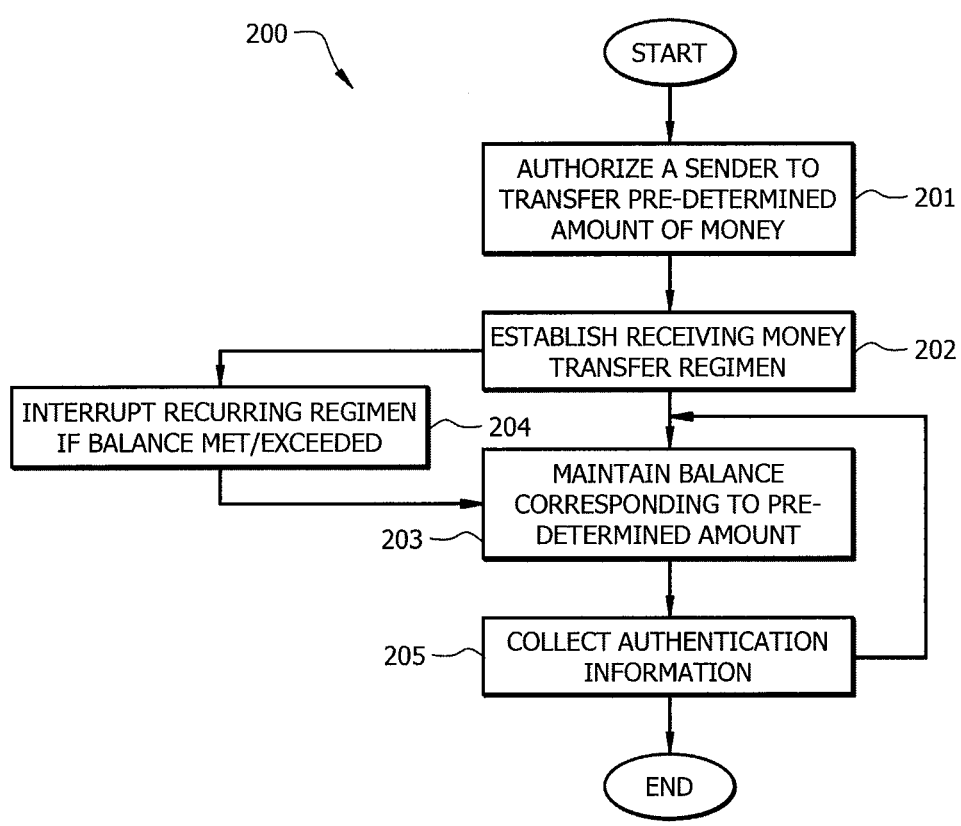
FIG. 2 illustrates a flowchart of a method for facilitating a money transfer transaction in accordance with an embodiment of the present application.

FIG. 2 illustrates a flowchart of a method 200 for facilitating a money transfer transaction in accordance with an embodiment of the present application. Method 200 may be implemented within a system such as system 100 or any other suitable system. Additionally, while method 200 is set forth in steps, it is noted that nothing in this application necessarily limits the order in which the illustrated steps are implemented. In fact, some steps may be implemented in different orders, simultaneously, at multiple points in time, or not at all.

Method 200 begins by authorizing a sender to transfer a pre-determined amount of money in one or more money transfer transactions 201. Such an authorization may be implemented utilizing information received from transaction reliability database 102 and/or third party database 103 as discussed above with respect to system 100 of FIG. 1.

A recurring money transfer transaction regiment is established at step 202 where one or more money transfer transactions are sent to at least one receiving party. In one embodiment, a recurring transaction regiment may include sending regular periodic payments between the sender and the at least one receiving party. Alternatively, in one embodiment once the regiment is established, money transfer transactions may be initiated by the receiving party. It is noted that such timing may be customized in any manner to fit a sender or receiver's particular needs. The a money transfer transaction regiment may be established at an agent location using, for example, agent devices 101a-101n. Additionally, a money transfer transaction regiment may be established using user devices 104a-104n. Moreover, embodiments may use a combination of these devices.

Method 200 further includes maintaining a balance corresponding to the pre-determined amount of money at step 203. Embodiments may allow the one or more money transfers to be made while the balance remains below the pre-determined amount of money. Conversely, when the balance meets or exceeds the pre-determined amount of money, embodiments may prevent further money transfer transactions at step 204. Decisions regarding whether to allow or prevent future transactions may be implemented at an agent location and may utilize a decision engine, such as decision engine 106, to make this determination.

Method 200 may optionally include accepting a payment from the sender after at least one of the one or more money transfer transactions is complete at step 205. Information regarding such a payment may be conveyed at step 206 in order to assist in the maintaining balance step 203.

Figure 3:
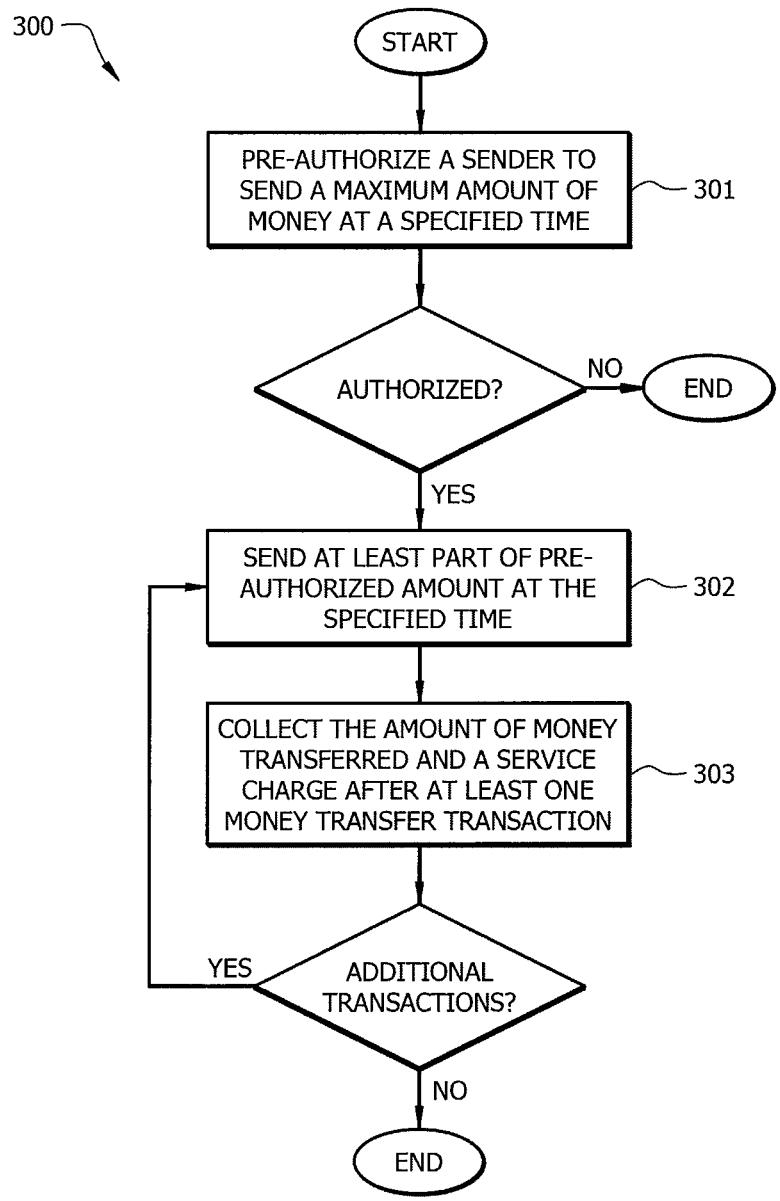
FIG. 3 illustrates a flowchart of a method for facilitating a money transfer transaction in accordance with an embodiment of the present application.

FIG. 3 illustrates a flowchart of a method 300 for facilitating a money transfer transaction in accordance with an embodiment of the present application. As was the case with respect to the flowchart of FIG. 2, method 300 may be implemented within a system such as system 100 or any other suitable system. Additionally, while method 300 is set forth in steps, it is noted that nothing in this application necessarily limits the order in which the illustrated steps are implemented. In fact, some steps may be implemented in different order, simultaneously, at multiple points in time, or not at all.

The method begins by pre-authorizing a sender to send a maximum amount of money to a receiving party at a specified time at step 301. This pre-authorization may take into account reliability information about the sender which is collected as discussed above with respect to transaction reliability database 102, third party transaction reliability database 103, etc. Similar to embodiments discussed above, the specified time may be a recurring time interval comprising a plurality of times, may be specified by the receiver, etc.

Once one or more transactions are authorized, method 300 further includes sending at least part of the pre-authorized amount of money at the specified time at step 302. Further, the amount of money transferred and a service charge for the at least one money transfer may be collected after the transfer has been sent at step 303.

In some embodiments the specified time may include a plurality of times and thereby create a plurality of transactions. If additional transactions are specified at step 304, method 300 may then repeat steps 302 and 303 in accordance with the organization defined for the transactions. It is noted that in some embodiments, money may be collected at step 303 prior to sending an additional transfer. Further, in some embodiments, money may be collected at a later time and additional transactions may be made so long as the total transaction amounts which have been and are being sent remains below the pre-authorized amount. Such a decision may be made at decision block 304.

Example Transaction Situations

The following description provides some example transaction situations which may utilize inventive aspects described herein. These are given by way of example to assist in understanding the capabilities of the present application and are not intended to limit the scope of embodiments to the present application.

The first example is a case wherein a family member desires to regularly transfer funds to family members abroad to assist in providing for their needs. The sender may enter an agent location and provide personal information which may include contact information, income information, and the like, to initiate a transaction schema. An agent may input such information and provide it to a decision engine (such as shown in FIG. 1). The decision engine may utilize the given information, information from a reliability database and/or a third party database to pre-authorize a transfer amount.

In this example, it will be assumed that an authorized amount is $700. Recurring money transfer transactions may be set it up once a month, twice a month, or any period which suits the needs of the sender. In this case the sender specifies that on the first and fifteenth of every month a transfer of the $350 will be sent.

With the recurring transaction schema in place, the money transfer service will create the specified transactions automatically as long as the sender is in good standing. For example, periodic transactions may be sent as long as the transaction does not cause the sender to exceed the pre-authorized limit. The money transfer service collects for the amounts sent as well as transaction charges for the money transfer. The transaction charges may vary depending on the timing of the repayment for the previous transactions.

With each transaction that is generated, the money transfer service may create a transaction identifier and provide it to the sender via text, email, etc., in order to notify the sender that the transaction has been sent according to their instructions. Further, this transaction identifier may be utilized by the receiving party to assist in authenticating the transaction.

Other notifications may also be sent to the sender corresponding to the recurring transactions. For example, if the sender is near a specified transaction time, but the sender owes enough money to the money transfer service that the transfer cannot be authorized, the sender may be notified accordingly. Additionally, such reminders may also be utilized to insure that the recurring nature of the money transfer transactions is still desired.

As such, in the above example, a money transfer schema is established which may compensate for situations where a sender becomes unable to send a money transfer using a real-time transaction. Such a situation may occur due to emergencies experienced by the sender, employment problems, and the like. The recurring transaction may also simply provide convenience to the sender, while also providing security to the receiving party who may be dependent on regular payment intervals.

A second example case may be referred to as a pre-approved transaction. In this case a money transfer service will register the sender and the sender will preauthorize a certain dollar amount to be given to a receiver without specifically ordering the amount to be transferred. When the receiver is in need for a sum of money, the receiver may then trigger the transaction by requesting the money from the sender through the money transfer service. The money transfer service may then authenticate the transaction and complete the transaction in accordance with the pre-approval. Such a transaction may assist a receiving party to having access to funds in many cases, such as in emergency situations.

A pre-approved transaction in this manner may allow the receiver to make multiple requests up to a pre-authorized amount. Further, it may be set up as a single transaction where the sender will have to approve further withdrawals. The sender may pre-pay the authorized amount, or the amount may be paid after a transaction takes place. In embodiments where payment is made after the transfer transaction, pre-authorization reliability information may be utilized to authorize the sender to send the requested amounts.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for facilitating money transfer transactions which fund on request of a receiving party, the method comprising:
   registering a sender, under the control of a processing device;
   determining, under control of the processing device, a total amount of money that is pre-authorized for transfer to the receiving party, wherein said determining comprises generating a score that indicates reliability that said total amount of money that is pre-authorized for transfer is later collectable from the sender, wherein said generating includes using (1) information regarding money transfer history of said sender, (2) information regarding type of transfer being pre-authorized, and (3) information from at least one third-party source, wherein said information from said at least one third party source comprises information regarding validity of a banking account of said sender and information regarding credit-worthiness of said sender;
   receiving from the sender, a criterion comprising a transaction code which allows the receiving party to receive transferred money;
   receiving a first request by the receiving party at the processing device to transfer money in a first transaction from the sender to the receiving party;
   authenticating, by the processing device, the first requested money transfer transaction to insure that the first requested money transfer is below the pre-authorized total amount;
   upon the first requested money transfer transaction being authenticated, completing the transaction and providing money, for the first request, to the receiving party;
   receiving a second request by the receiving party at the processing device to transfer money in a second transaction from the sender to the receiving party;
   authenticating, by the processing device, the second requested money transfer transaction to insure that a total amount of money requested in the first and second request is below the pre-authorized total amount; and
   upon the second requested money transfer transaction being authenticated, completing the second requested transaction and providing money, for the second request, to the receiving party.

2. The method of claim 1 wherein the sender provides funds for the pre-authorized amount at the time of registering the sender.

3. The method of claim 1 wherein the sender provides funds for the money requested by the receiving party after the completion of the money transfer transactions.

4. The method of claim 3 further comprising maintaining a balance corresponding to the pre-authorized amount of money.

5. The method of claim 1 further comprising
   receiving a third request by the receiving party at the processing device to transfer money in a third transaction from the sender to the receiving party;
   authenticating the third requested money transfer transaction to insure that the amount of money requested in the first, second and third request is below the pre-authorized total amount; and
   upon the third requested money transfer transaction being authenticated, completing the third requested transaction and providing money, for the third request, to the receiving party.

6. A system for facilitating money transfer transactions, the system comprising:
   at least one computing device comprising a processor, said at least one computing device configured to:
   register a sender;
   determine a total amount of money that is pre-authorized for transfer to a receiving party, at least in part by generating a score that indicates reliability that said total amount of money that is pre-authorized for transfer is later collectable from the sender, wherein said generating includes using (1) information regarding money transfer history of said sender, (2) information regarding type of transfer being pre-authorized, and (3) information from at least one third-party source, wherein said information from said at least one third party source comprises information regarding validity of a banking account of said sender and information regarding credit-worthiness of said sender;
   receive from the sender, a criterion comprising a transaction code which allows the receiving party to receive transferred money;
   receive a first request by the receiving party to transfer money in a first transaction from the sender to the receiving party;
   authenticate the first requested money transfer transaction to insure that the first requested money transfer is below the pre-authorized total amount;
   upon the first requested money transfer transaction being authenticated, complete the transaction and provide money, for the first request, to the receiving party;

receive a second request by the receiving party to transfer money in a second transaction from the sender to the receiving party;

authenticate the second requested money transfer transaction to insure that a total amount of money requested in the first and second request is below the pre-authorized total amount; and upon the second requested money transfer transaction being authenticated, complete the second requested transaction and provide money, for the second request, to the receiving party.

7. The system of claim 6 wherein the sender provides funds for the pre-authorized amount at the time of registering the sender.

8. The system of claim 6 wherein the sender provides funds for the money requested by the receiving party after the completion of the money transfer transactions.

9. The system of claim 8 wherein the at least one computing device is further configured to maintain a balance corresponding to the pre-authorized amount of money.

10. The system of claim 6, wherein said at least one computing device is further configured to:

receive a third request by the receiving party to transfer money in a third transaction from the sender to the receiving party;

authenticate the third requested money transfer transaction to insure that the amount of money requested in the first, second and third request is below the pre-authorized total amount; and upon the third requested money transfer transaction being authenticated, complete the third requested transaction and provide the requested money, for the third request, to the receiving party.

* * * * *